July 16, 1968

C. W. TELLIER, JR 3,393,105

METHOD AND APPARATUS FOR ADHESIVELY SECURING THE TAIL
OF A ROLL PRODUCT TO THE UNDERLYING
CONVOLUTION THEREOF

Filed Nov. 16, 1964

INVENTOR.
CLAIR W. TELLIER, JR.

BY

Stanley Bialos
ATTORNEY

INVENTOR.
CLAIR W. TELLIER, JR.
BY
Stanley Bialos
ATTORNEY

INVENTOR.
CLAIR W. TELLIER, JR
BY Stanley Bialos
ATTORNEY

INVENTOR.
CLAIR W. TELLIER, JR.
BY
Stanley Bialos
ATTORNEY

United States Patent Office 3,393,105
Patented July 16, 1968

3,393,105
METHOD AND APPARATUS FOR ADHESIVELY SECURING THE TAIL OF A ROLL PRODUCT TO THE UNDERLYING CONVOLUTION THEREOF
Clair W. Tellier, Jr., Yuba City, Calif., assignor to Crown Zellerbach Corporation, San Francisco, Calif., a corporation of Nevada
Filed Nov. 16, 1964, Ser. No. 411,528
22 Claims. (Cl. 156—187)

ABSTRACT OF THE DISCLOSURE

A roll product is received at a tail-securing station where an unsecured tail of the roll is unwound from the roll, with the aid of air jets and a cooperating hood structure, a distance greater than a predetermined distance. The roll is continuously rotating in a rewinding direction and, when the tail extends a predetermined distance from the roll, tail displacement means are operative to force the tail against adhesive rollers which apply adhesive to the tail in a predetermined pattern. After rewinding is completed, the adhesive adheres the tail to an underlying convolution on the roll, and then the roll is ejected from the tail-securing station.

This invention relates to apparatus for and a method of securing the tail or outer terminal convolution of a roll product to the subjacent underlying convolution thereof. A cant of toilet tissue may be taken as an example of such roll product, and securance of the tail thereof can be accomplished between the web rewinding operation in which the cant is wound from a web as it is withdrawn from a large supply roll and the packaging operation in which the individual rolls of tissue, formed by appropriately segmenting such cant, are enclosed in wrappers.

One of the problems in a paper converting operation in which roll products in commercial sizes are rewound from a large parent supply roll, is that the tail or outer terminal convolution of the rewound roll product should be secured to the contiguous underlying convolution prior to the roll being advanced into automatic wrapping machinery. If the tail of the roll product is not held down against or secured to such underlying convolution, the wrapping operation may not be performed properly, in which event the wrapping machines may jam because of a consequent miswrap or, if the wrap is successfully performed, excess paper (i.e., the unsecured tail or a portion thereof) from the roll product may project outwardly from the wrapper making an unsightly package.

In order to obviate this problem in commercial paper converting operations, it is customary to have personnel positioned adjacent the entrance to the automatic wrapping machinery to make certain that each roll product entering the same does not have a loose or unsecured tail which could create difficulties in the wrapping operation. The requirement for the presence of such personnel is both costly and inconvenient, and in some instances reduces the total quantity of the product that is processed by the wrapping machinery because the speed of the wrapping operation is restricted by manual limitations. Since this problem is rather universal in the paper industry, it is known that considerable effort has been expended in an endeavor to provide apparatus and techniques for automatically securing the tail of a roll product to the underlying web thereof before the roll product enters the wrapping machinery. However, irrespective of such efforts, it is believed that no satisfactory apparatus has been proposed, and so far as is known, none is commercially available.

It is, accordingly, a general object of the present invention to provide improved apparatus for and a method of securing the tail or outer terminal convolution of a roll product to the web convolution immediately underlying such tail; and this is accomplished with each roll product by positioning the same at a tail-securing or operating station, rotating the product in a direction tending to wrap the tail or terminal convolution thereabout, unwinding such terminal convolution as the product so rotates, and then applying an adhesive to a predetermined portion of the unwound tail prior to its being rewound upon the roll product to secure it to the underlying convolution.

Additional objects and advantages including those of a particularized character will become apparent as the application develops.

An embodiment of the invention is illustrated in the accompanying drawings, in which.

Figure 1:
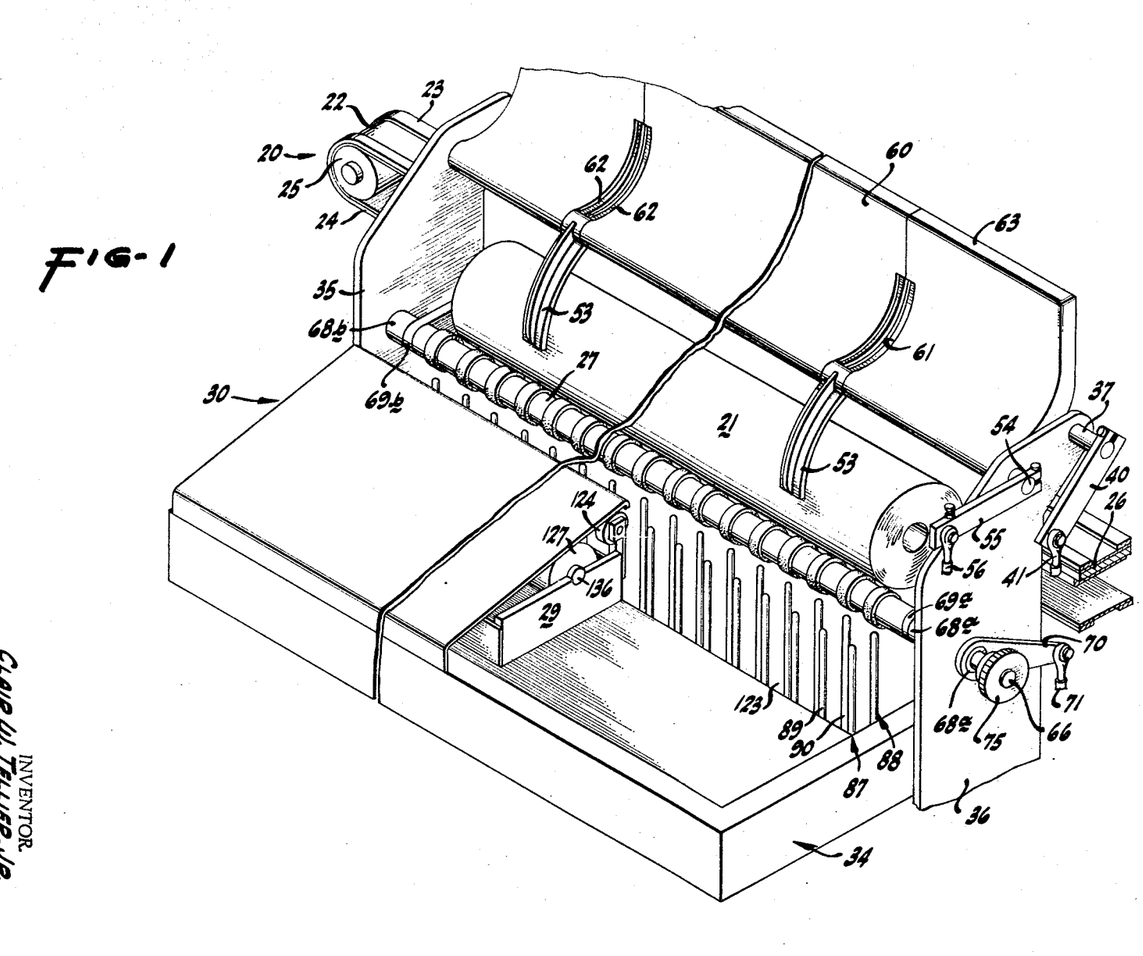
FIGURE 1 is a broken perspective view of apparatus embodying the invention.

The over-all apparatus illustrated in FIGURE 1 includes an infeed conveyor generally designated with the numeral 20. The conveyor 20, in the case of the roll product being a cant of toilet tissue, may be provided by the rewinding apparatus on which such cants are formed. In any event, the conveyor 20 is operative to successively advance cants of material generally from right to left, as viewed in FIGURE 1 (although such direction of movement is not critical), to a location whereat the cant is displaced from the conveyor and into the position shown in FIGURE 1 by the cant 21. The exemplary conveyor illustrated includes an endless belt 22 having raised longitudinal edge portions 23 and 24 which prevent a cylindrical roll product such as the cant 21 from rolling off the belt. The belt 22 is entrained about the usual drive and idler rollers, such as the roller 25 illustrated in FIGURE 1; and a support bed or platform 26 may be disposed along the undersurface of the advancing leg of the belt 22 to help sustain the weight of each cant 21.

The roll product 21 may be formed from a web of any suitable material as, for example, cloth of either natural or synthetic fibers, plastic materials, metallic foils, and paper—either single layer or multiple laminate. As a specific example, the roll product 21 may be a cant of toilet tissue which will be cut into toilet-roll widths and then enclosed in appropriate wrappers after the tail of the cant has been secured to the underlying convolution. The roll product or cant 21 may be of any suitable length and, quite evidently, the apparatus will be designed to accommodate predetermined maximum lengths. As concerns a cant of toilet tissue, the length thereof depends upon the rewinding machinery and there is no particular standard in the paper industry. Typical lengths, however, are 55, 66, 90 and 92 inches.

The tail-securing apparatus includes a single operating station at which the cant 21 is located while all of the various functions are performed that culminate in the tail securance. Such station is illustrated in FIGURE 1 by the location of the cant 21, and is defined in part by a continuously rotating roller or shaft 27 which in conjunction with an associated shaft 28 (see FIGURE 2) receives and supports a cant 21 thereon. In a functional sequence, the cant is displaced from the conveyor 20 into the operating station and is properly centered or positioned thereat as a part of the displacement procedure. In the operating station the cant is rotatably driven by the roller 27 and while the cant is rotated, the tail portion 21a (FIGURE 3) thereof is displaced or unwrapped therefrom. An adhesive is applied to the upwrapped tail at an adhesive station 29 into which the tail extends, and the tail is then wrapped or wound about the cant and is thereby secured by the adhesive to the underlying convolution. The cant is thereafter displaced laterally from the operating station onto a discharge mechanism or conveyor which, in the particular apparatus shown, comprises in part an inclined chute or surface 30.

Figure 2:
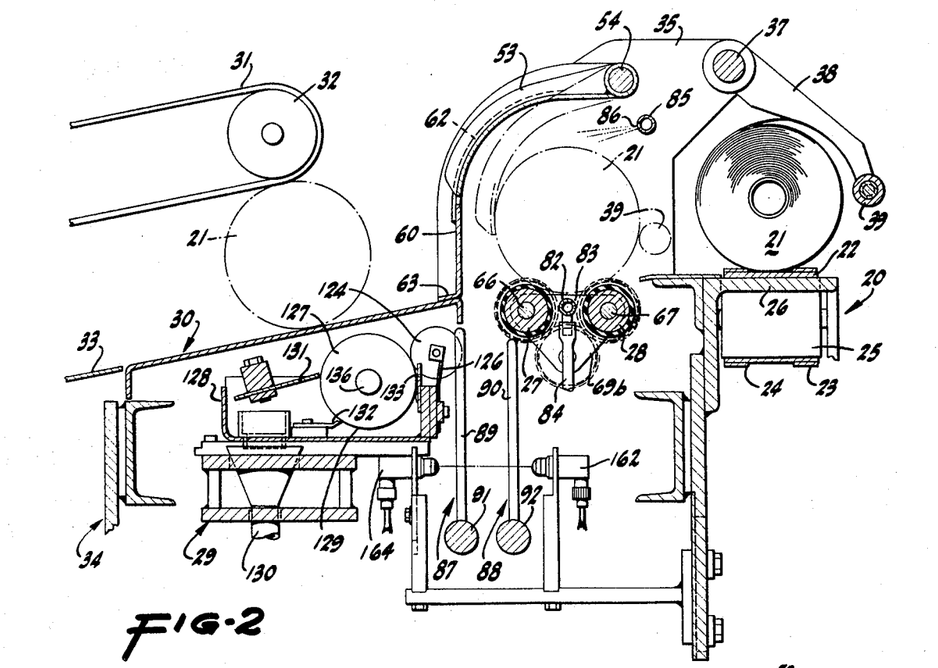
FIGURE 2 is a vertical sectional view through the apparatus.

As seen in FIGURE 2, a compression device in the form of an endless conveyor belt 31 is disposed along the inclined chute 30 in substantially parallel orientation therewith and is entrained about a roller 32. The belt 31 cooperates with the chute 30 to define a controlled advance toward the left, as seen in FIGURE 2, for each discharging cant, and the belt also applies compressional forces to the cant so as to enable the adhesive to cure while the tail is being urged against the underlying convolution. The discharge apparatus in the case of toilet tissue cants is adapted to lead into cutting apparatus which operates to sever the cants into roll widths, and then to wrapping mechanism at which the individual rolls are enclosed within a cellophane or other wrapper. Such subsequent apparatus is generally indicated in FIGURE 2 by the surface 33 which forms a continuation of the chute 30.

Referring to FIGURES 1 and 2, the tail-securing apparatus is seen to have frame structure generally indicated in its entirety by the numeral 34. In that the frame structure may be conventional and comprises the usual channels, brackets, end walls and similar elements, it will not be described in detail and the various components thereof will simply be treated as part of such composite frame structure with the exception of the end walls or plates 35 and 36 which are separately indicated for the purpose of orientation. The infeed conveyor 20 is disposed along the rear of the apparatus with the support element 26 being welded or otherwise fixedly secured to the frame structure 34.

Extending between the end plates 35 and 36, which project rearwardly at their upper ends so as to be disposed generally above the infeed conveyor 20 in spaced relation therewith, is a rod or shaft 37 journalled for rotation in each of the end plates. The shaft 37 is equipped at spaced locations therealong with a plurality of pusher arms 38 which are constrained upon the shaft (such as by means of clamp collars) so as to rotate therewith and be prevented from axial displacements along the length thereof. At their outer lower ends, the pusher arms 38 may be connected together by a pusher bar 39; and, as shown in FIGURE 2, the bar 39 in one position thereof is located rearwardly of both the conveyor 20 and a cant 21 supported thereon. Such location may be taken to be the cant-infeed position, and the bar 39 when oriented thereat is disposed in a vertical sense generally along the center portion of such cant.

The pusher assembly defined by the shaft 37, arms 38 and bar 39 is adapted to be rotated in a clockwise direction, as viewed in FIGURE 2, from the cant-infeed position and into the location illustrated by broken lines wherein the bar 39 is disposed forwardly of the conveyor 20. The function performed by the pusher assembly in so rotating about the center defined by the longitudinal axis of the shaft 37 is to displace a cant 21 from the infeed conveyor 20 and into the tail-securing or operating station defined by the rollers 27 and 28. Following this displacement, the pusher assembly is returned to its starting or cant-infeed position (illustrated by full lines in FIGURE 2) preparatory to displacing the next cant from the infeed station along the conveyor 20 and into the tail-securing station along the rollers 27 and 28.

The angular reciprocatory displacement of the pusher assembly are effected by drive mechanism (see FIGURE 7) constituting a link 40 fixedly clamped at one end to that end portion of the shaft 37 projecting outwardly from the end wall 36 of the apparatus. The link 40 is pivotally connected at its opposite end to a push rod 41 which extends downwardly therefrom and at its lower end portion is pivotally connected to one arm of a bell crank 42. The bell crank 42 is supported intermediate its ends for angular displacements about a pivot pin 43, and its other arm is equipped with a cam follower 44 that rides upon a cam 45 keyed or otherwise rigidly secured to a shaft 46 journalled in the frame structure for rotation relative thereto. A suitable pulley wheel or sheave 47 is also affixed to the shaft 46 in a manner preventing relative rotation therebetween, and entrained about the sheave 47 is a pulley belt 48 which is also entrained about a drive sheave 49 fixed on the output shaft 50 of a gear reducer 51—the input of which is supplied by the shaft of a drive motor 52.

The motor 52 imparts torque to the shaft 50 and drive sheave 49 mounted thereon which, through the belt 48, sheave 47 and shaft 46, rotatably drives the cam 45. As a consequence, the bell crank 42 is cyclically displaced in a counterclockwise direction (as viewed in FIGURE 7) whenever the enlarged portion or lobe 45' of the cam 45 is rotate into engagement with the cam follower 44, whereupon the push rod 41 is displaced upwardly and the link 40 rotates the shaft 37 in a clockwise direction to swing the pusher assembly inwardly and thereby displace a cant 21 from the infeed conveyor 20 and into the operating station defined by the shafts 27 and 28. Thereafter, the cam follower 44 rides downwardly and off of the cam lobe 45', whereupon the bell crank 42 is rotated in a clockwise direction, and the pusher assembly is returned to its initial position which is shown by full lines in FIGURE 2.

Evidently, the usual biasing means (helical springs in the customary case) will be included in the structure in connection with the bell crank assembly so as to bias the cam follower 44 into engagement with the surface of the cam 45. In that biasing means of this type is old and well known and may be conventional in the present apparatus, it has been omitted from the drawings for purposes of simplifying the same to thereby make the illustration more clear.

Proper location of the roll product or cent 21 at the tail-securing station defined by the rollers 27 and 28 involves the coaction with the pusher assembly of stop elements which prevent the cant from being displaced beyond the rollers 27 and 28 or toward the left, as viewed in FIGURE 2, as a consequence of the combined motions being imparted to the cant which aggregate (a) the inward displacement thereof effected by the pusher assembly and (b) the angular motion effected by rotation of the roller 27. In the specific structure shown, such stop elements comprise a plurality of arcuate arms 53 which are disposed between the frame end plates 35 and 36 in spaced apart relation. As respects the fuction of the arcuate arms 53 in cooperating with the pusher assembly to center a cant 21 at the tail-securing station, the arcuate arms are selectively movable between the neutral or intermediate position illustrated by full lines in FIGURE 2 and an inward cant-centering position shown by broken lines in this figure.

Such selective movement of the stop elements is effected by a shaft 54 extending between the end plates 35 and 36 and journalled for rotation therein. Each of the stop elements is equipped at its inner end with a collar coaxiallly related to the shaft 54 and constrained thereon against relative displacements with respect thereto. Therefore, the arcuate arms 53 are angularly displaceable about the center defined by the longitudinal axis of the shaft 54 upon appropriate angular or rotational displacements of the shaft. Such rotational movements of the shaft (as seen most clearly in FIGURE 7) are imparted thereto by a link 55 fixedly clamped to an end portion of the shaft 54 located outwardly of the frame end wall 36.

Figure 7:
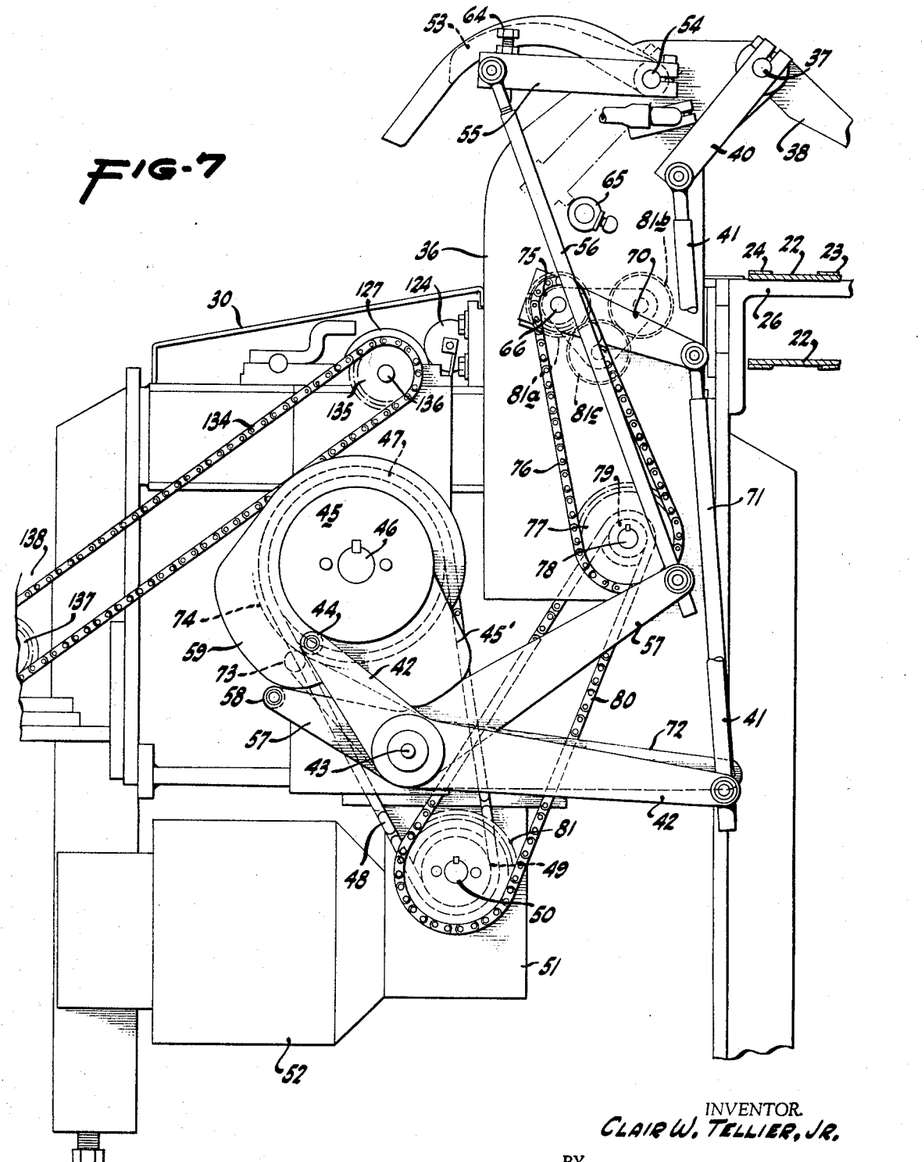
FIGURE 7 is an end view in elevation taken along the exterior of the end plate and illustrating various drive linkages.

Adjacent its outer end, the link 55 is povitally connected to the upper end of a push rod 56 which at its lower end is pivotally connected to one arm of a bell crank 57 supported intermediate its ends for pivotal displacements about the axis defined by the aforementioned pin 43. Adjacent its outer end, the other arm of the bell crank 57 is equipped with a cam follower 58 adapted to ride along a cam 59 which is keyed to or otherwise fixedly related to the shaft 46 so as to be rotated thereby. Therefore, as the shaft 46 is continuously rotated by the motor 52, the cam 59 rotates therewith and the bell crank 57 is angularly displaced in accordance with the configuration of the cam. Accordingly, the push rod 56 is reciprocated, and the shaft 54 and arcuate arms 53 connected therewith are displaced through angular distances and directions dependent upon the cam configuration.

Figure 4:
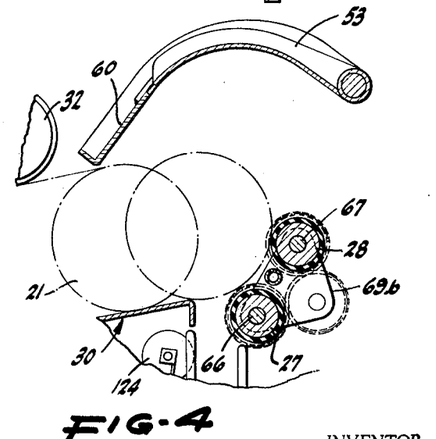
FIGURE 4 is a broken vertical sectional view essentially the same as FIGURE 3, but showing the apparatus in yet another operating condition.

As shown in FIGURE 7, and also in FIGURE 4, the arcuate arms 53 are movable to an outer discharge position remote from the conveyor chute 30 so as to permit a cant 21 to be displaced thereonto subsequent to the tail-securing operation. Movement of the arcuate arms 53 into such outer discharge position is effected through the linkage heretofore described, which includes the link 55, push rod 56, bell crank 57 and cam 59; and while such linkage displaces the arcuate arms 53 inwardly when a fresh cant with an unsecured tail is to be centered in the tail-securing station, the linkage next returns the stop elements to their intermediate position for the tail-securing operation and thereafter displaces the arcuate arms into the discharge position so that a cant with the tail thereof secured thereto can be discharged from the mechanism and onto the chute 30.

Figure 3:
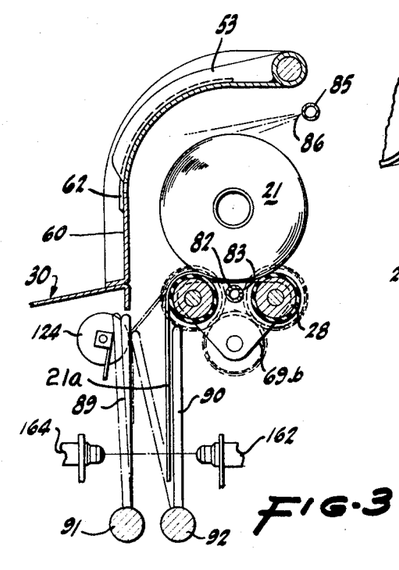
FIGURE 3 is a broken vertical sectional view similar to that of FIGURE 2, but illustrating the apparatus in a different operating condition.

As shown most clearly in FIGURE 1, the apparatus includes a hood 60 which is, but need not necessarily be, formed in a plurality of sections having contiguous edge portions adjacent the various arcuate arms 53. The hood 60 has an arcuate configuration that conforms essentially to the curvature of the arcuate arms 53, as is most evident in FIGURES 2, 3 and 4. The hood together with such stop elements define a substantially longitudinally-continuous surface spaced from the cylindrical surface of a cant 21 located at the tail-securing station and having an arcuate length somewhat less than 180°. Thus, the hood extends from one edge thereof (which is in substantial abutment with the chute 30 as seen in FIGURE 2) to the other edge thereof which is equipped with a collar telescopically and pivotally receiving the shaft 54 therein. In order to define such a substantially uninterrupted surface in conjunction with the arcuate arms 53, the hood 60 is provided with a plurality of openings or cut-out portions 61 conforming generally to the shape of the arcuate arms and respectively aligned therewith so as to receive such arcuate arms therein, as shown in FIGURES 2 and 3.

Quite evidently, the hood 60 must be swung upwardly and into the position shown in FIGURE 4 to permit a cant 21 to be ejected from the tail-securing station and onto the discharge chute 30; but because the hood is freely pivotal with respect to the shaft 54, such upward displacements of the hood cannot be effected directly from the shaft. In the present structure the hood 60, or each of the separate sections thereof, is provided along its outer surface with a plurality of abutment elements or strips 62 respectively associated with and extending outwardly into the openings 61. Since each of the arcuate arms has an inverted T-shaped cross section, the web of the T is insertable through the associated opening 61 and the flanges of the T are engageable with the adjacent abutment elements 62. As a consequence, when the arcuate arms are swung upwardly and into the discharge position shown in FIGURES 4 and 7, the arcuate arms necessarily carry the hood 60 into such upper discharge position because of the engagement of the arcuate arms 53 with the abutment elements 62.

The limit of the maximum downward arcuate movement of the hood 60 (that is, in a counterclockwise direction as viewed in FIGURES 2 and 3) is defined by abutment of the lower edge 63 of the hood with the inner end of the inclined chute 30. Therefore, the hood is constrained from following the stop elements 53 inwardly into the cant-centering position thereof shown by dotted lines in FIGURE 2.

The usual biasing means (helical springs in the customary case) are included in the structure for biasing the bell crank 57 in a direction such that the cam follower 58 thereof continuously engages the surface of the cam 59 although the weight of the arcuate arms 53 (and of the hood 60 in certain instances) will tend to effect such engagement of the cam follower with the cam. However, since biasing means of such type is old and well known, it has been omitted from the drawings for purposes of clarity. Also, the limit of the inward displacement of the arcuate arms 53 into the cant-centering position thereof can be selectively determined by adjustable stop means such as the set screw 64 shown in FIGURE 7, which is adapted to abut a suitable stop 65 provided therefor which is rigidly related by appropriate mounting structure to the frame end plate 36. The provision of such adjustable means enables the arcuate arms in the performance of their cant-centering function to accommodate cants of different diameter.

After the tail of a cant has been secured thereto, it is necessary to discharge or eject the cant from the tail-securing position defined by the rollers 27 and 28. As stated heretofore, the cant is intended to be ejected into the infeed of a discharge conveyor defined in part by the inclined chute 30; and, therefore, it is necessary that the ejection of the cant be accomplished with the hood 60 and arcuate arms 53 in the elevated positions thereof, as shown in FIGURE 4. This figure also illustrates a completed cant 21 in the process of being ejected from the tail-securing station. The ejection of the cant is accomplished by angularly displacing or pivoting the roller 28 about a center established by the longitudinal axis of the roller 27. Thus, as shown (for example, by comparing FIGURES 3 and 4), the roller 28 is displaced in a counterclockwise direction with reference to these figures, which causes the cant 21 to be ejected onto the inclined discharge chute 30.

In terms of structure, the two rollers 27 and 28 are oriented in spaced apart parallelism and are respectively equipped with axles or shafts 66 and 67. The shaft 66 extends through the frame end plates 35 and 36, and is journalled for rotation therein within a pair of sleeves 68a and 68b respectively secured to brackets 69a and 69b. The sleeves 68a, 68b are related to the respectively associated frame plates 35 and 36 for limited pivotal displacements with respect thereto; and as shown in FIGURES 1 and 7, at least the sleeve 68a has fixedly secured thereto exteriorly of the end plate 36 a link 70 which has pivotally connected thereto at one end thereof a push rod 71 that at its opposite end is pivotally secured to one arm of a bell crank 72 supported intermediate the ends thereof for pivotal displacements about the aforementioned pivot pin 43. The opposite arm of the bell crank 72 is provided with a cam follower at 73 which rides on a cam 74. In the normal position of the bell crank, push rod and link, the brackets 69a, 69b are in the generally horizontal positions illustrated in FIGURES 1, 2 and 3.

However, when a cant 21 is to be ejected into the discharge conveyor, the cam 74 rotates the bell crank 72 in a counterclockwise direction (as viewed in FIGURE 7), the link 70 is therefore correspondingly pivoted in a counterclockwise direction, the sleeve 68a in being connected with the link is necessarily pivoted in such direction, and the bracket 69a is thereby swung angularly in a counterclockwise direction into the position shown in FIGURE 4. The shaft 67 of the roller 28 is supported by the brackets 69a, 69b and is journalled for rotation with respect thereto. Consequently, such counterclockwise displacement of the brackets 69a, 69b swings the entire roller 28 through an arcuate path the center of which is defined by the roller 27 or shaft 66 thereof. Therefore, a cant 21 supported upon the rollers 27 and 28 is necessarily ejected onto the inclined chute 30 by such angular displacement of the roller 28, as shown in FIGURE 4.

The drive for the roller 27 includes a sheave or sprocket 75 keyed or otherwise fixedly secured to the shaft 66. Entrained about the sheave 75 is an endless belt 76 which at its opposite end is entrained about a pulley wheel 77 keyed to a shaft 78 which also has keyed thereto a pulley wheel 79 of lesser diameter. Entrained about the wheel 79 is an endless belt 80 which is also entrained about a pulley wheel 81 keyed to the aforementioned output shaft 50 of the gear reducer 51. Therefore, whenever the motor 52 is energized, the shaft 66 and roller 27 are rotated. The roller 28 is positively driven in the structure shown, and this is accomplished, as indicated in FIGURE 7, by equipping the shaft 66 interiorly of the frame plate 36 with a gear 81a which drives a gear 81b through an idler 81c. The gear 81b is mounted upon the shaft 67 of the roller 28 and the idler gear 81c is rotatably supported by the bracket 69a. Thus, both of the rollers 27 and 28 are rotatably driven even during those periods when a cant 21 is being ejected from the operating station, as shown in FIGURE 4.

The tail 21a of the roll product 21 is unwound therefrom prior to the application of an adhesive by means of which the tail is secured to the immediately underlying convolution of the roll product. Such unwinding of the tail is accomplished by air under pressure appropriately directed toward the tail from nozzle structure extending along the cant. Referring to FIGURES 2 and 3 in particular, it will be noted that a tubular nozzle structure 82 extends longitudinally between the brackets 69a and 69b and is fixedly located with respect thereto. The nozzle structure 82 is provided therealong with a plurality of longitudinally spaced apertures 83 which are inclined with respect to the horizontal at an angle in the order of 30°, and such openings face rearwardly or toward the infeed conveyor 20. The elongated nozzle structure 82 is connected through a flexible hose or conduit 84 and control valve to a suitable source (not shown) of compressed air.

A second tubular nozzle structure 85 (provided with a plurality of spaced apart discharge openings 86 therealong) extends between the frame end plates 35 and 36 and is carried thereby. The nozzle structure 85 is connected to such source of compressed air through the aforementioned control valve so that when such valve is open, air under pressure is discharged concurrently through the openings 83 and 86 of the respectively associated nozzle structures 82 and 85. It is evident that the flexible conduit 84 permits the nozzle structure 82 to be displaced with the brackets 69 when a cant 21 is ejected from the tail securance station.

Figure 6:
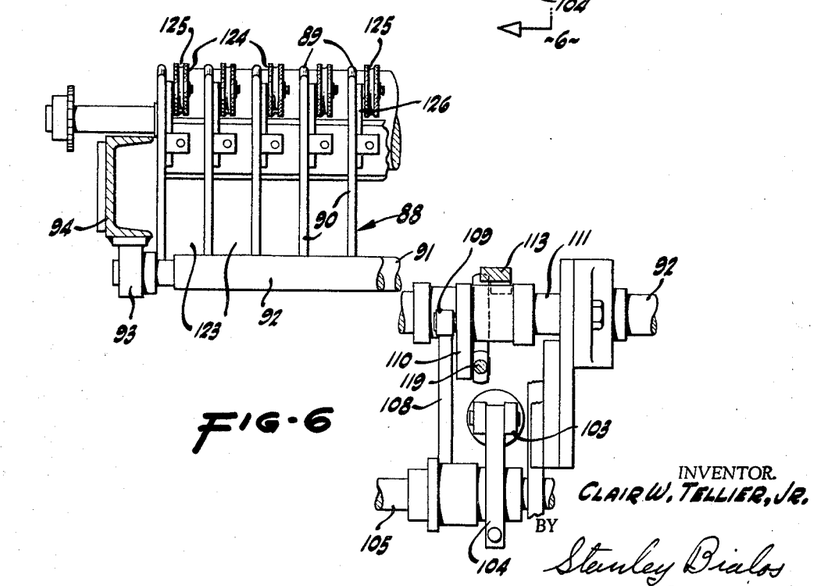
FIGURE 6 is a broken longitudinal sectional view taken generally along the line 6—6 of FIGURE 5.

Adhesive is applied to the tail of each cant 21 after the associated tail is unwound therefrom, at which time the trail is located intermediate two transversely spaced and longitudinally extending rows 87 and 88 of tines or posts 89 and 90 which are respectively secured adjacent the lower ends thereof to shafts 91 and 92. The shafts 91 and 92 extend generally between the frame plates 35 and 36 and, as shown best in FIGURE 6, are journalled for rotation in bearing structures 93 carried by the channel members 94 which comprise a part of the frame structure 34. Thus, the apparatus provides a first row 87 of longitudinally spaced tines 89 which are substantially parallel to each other and lie within a common plane. Such tines 89 are supported by a shaft 91 rotatably carried by the frame structure of the apparatus. Similarly, a second row 88 of longitudinally spaced tines 90 (which are substantially parallel to each other and lie within a common plane), are supported by a shaft 92 which is also rotatably carried by the frame structure in transversely spaced and substantially parallel relation with the shaft 91.

Figure 5:
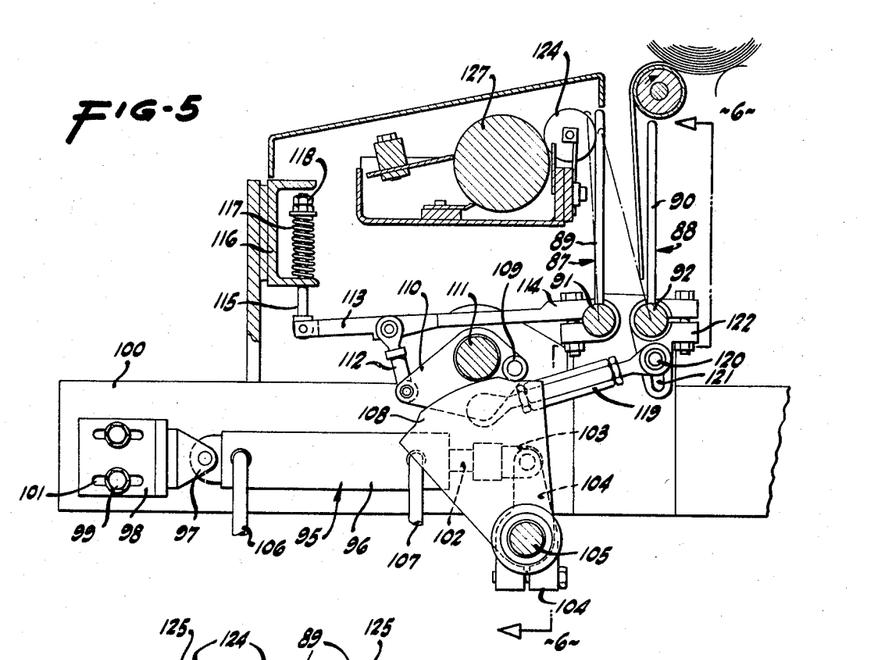
FIGURE 5 is essentially an end view in elevation, with the frame end plate removed, illustrating the actuating mechanism for the adhesive applicator.

The shafts 91 and 92 are angularly reciprocable about the respective longitudinal axes thereof, and the mechanism by which such selective pivotal movements are imparted to the shafts is shown most clearly in FIGURES 5 and 6. Such mechanism includes motor means 95 in the form of piston-cylinder structure wherein the cylinder 96 is pivotally secured at one end thereof (as shown at 97) to a bracket 98 adjustably secured by cap screws 99 to a frame element 100 comprising a part of the frame structure 34. The cap screws 99 respectively pass through elongated openings or slots 101 in the bracket 98, and this arrangement permits the precise location of the cylinder 96 to be selectively determined within the dimensional limits of the elongated slots 101.

The cylinder 96 has a reciprocable piston mounted therein that carries a piston rod or plunger 102 extending outwardly from the cylinder and equipped at its outer end with a bifurcated end portion 103 pivotally secured to a link 104 which is clamped to a shaft 105 suitably supported for rotation by appropriate elements of the frame structure 34. Quite evidently, as the piston rod 102 is reciprocably displaced along the longitudinal axis thereof in opposite directions, the shaft 104 is correspondingly displaced angularly in clockwise and counterlockwise directions (as viewed in FIGURE 5) in accordance with the direction of linear displacement of the rod 102. The piston is reciprocated within the cylinder 96 by the application of compressed air in one direction or the other through the conduits 106 and 107 from the aforementioned source of compressed air (not shown).

Clamped to the shaft 105 so as to rotate therewith is a cam 108 having riding thereon a cam follower 109. The cam follower 109 is carried by a drive link 110 which is supported by a shaft 111 and is angularly displaceable relative to the axis thereof. The drive link 110 has pivotally secured to one end thereof a push rod 112 which at its opposite end is pivotally secured to a lever 113 intermediate the ends thereof. The lever is fixedly anchored at one of its ends by a clamp collar 114 to the shaft 91 so as to rotate therewith. Adjacent its opposite end, the lever 113 has a pin 115 pivotally secured thereto that extends upwardly through a bracket 116 rigidly carried by the frame structure. A helical spring 117 surrounds the pin 115 and seats downwardly against a surface provided therefor by the bracket 116. The spring 117 also seats against stop structure 118 carried by the pin 115. Therefore, the spring 117 resiliently biases the lever 113 in a clockwise direction relative to the axis of the shaft 91, and, consequently, it biases the shaft 91 in the same angular direction.

The drive link 110 is also pivotally connected to one end portion of a push rod structure 119, which at its opposite end is equipped with a pivot pin 120 slidably mounted within an elongated slot 121 provided in a depending end portion of a clamp collar 122 which is fixedly related to the shaft 92 so as to rotate therewith. The pin and slot connection of the push rod 119 and clamp collar 122 permits angular movement of the clamp collar in response to generally linear displacements of the push rod 119.

It will be evident that whenever the motor means 95 is energized so that the rod 102 is displaced toward the right (as viewed in FIGURE 5), the link 104, shaft 105 and cam 108 will be angularly displaced in a clockwise direction. As a consequence, the elevated portion of the cam 108 will displace the cam follower 109 upwardly, and the drive link 110 will be angularly displaced thereby in a counterclockwise direction as viewed in FIGURE 5, whereupon the push rod 112 will be displaced downwardly and the movement thusly imparted to the lever 113 will cause the shaft 91 and row 87 of tines 89 to be angularly displaced in a counterclockwise direction. Such counterclockwise displacement of the drive link 110 will also cause the push rod 119 to be displaced toward the right as viewed in FIGURE 5, whereupon the shaft 92 and row 88 of tines 90 will be angularly displaced in a counterclockwise direction. The throw of the push rod 119 is somewhat greater than the throw of the push rod 112; and, therefore, the angular displacement imparted to the row 88 of tines will be greater than the angular displacement imparted to the row 87 of tines.

As shown most clearly in FIGURES 2 and 3, the tines 89 are slightly longer than the tines 90, but both of the rows 87 and 88, which respectively comprise the tines 89 and 90, extend upwardly to a location generally in line with the lowermost extremity of the roller 27. Also, the tines 89 in the normal position thereof shown in FIGURES 2 and 4 are approximately aligned vertically with the downwardly turned inner end of the chute 30. As seen in FIGURE 6, the longitudinally spaced tines 89 are aligned, respectively, with the correspondingly spaced tines 90, and for purposes of specific identification, the spaces between the successive tines are each denoted with the numeral 123. Respectively aligned with the spaces 123 are a plurality of adhesive applicator wheels or rollers 124.

In the particular adhesive applicator structure shown (which particular structure is not essential), each of the applicator wheels 124 is knurled and recessed centrally, as shown at 125, and the two spaced ribs defined thereby apply narrow strips of adhesive to the tail of the roll product 21. Each of the applicator wheels 124 is rotatably supported by bracket structure 126 and is rotatably driven by frictional engagement with an adhesive transfer roller 127. The applicator wheels 124 and transfer roller 127 are comprised by a conventional adhesive applicator structure which defines the aforementioned adhesive applicator station 29.

Such structure further includes a pan or container 128 providing a compartment 129 therein into which extends a portion of the transfer roller 127. Adhesive may be supplied to the compartment 129 through a conduit system 130 that communicates with the compartment 129 and is adapted to be connected to a source (not shown) of adhesive. A doctor blade 131 cooperates with the transfer roller 127, which rotates in a clockwise direction as viewed in FIGURE 2, to limit the amount of adhesive carried by the surface thereof toward the applicator wheels 124.

A scraper 132 located within the compartment 129 also cooperates with the cylindrical surface of the transfer roller 127 to prevent adhesive returned to the compartment 129 by the transfer roller 127 from adhering to the surface thereof since in time, any such remaining adhesive might tend to harden. A plurality of upwardly extending scrapers 133 may be respectively disposed along the sides of the applicator wheels 124 to prevent the build-up of adhesive along such side walls. As shown in FIGURE 7, the transfer roller 127 is continuously driven by means of an endless belt 134 which is entrained at one end about a sheave 135 fixedly secured to the shaft 136 of the transfer roller and is entrained at its other end about a pulley wheel or sheave 137 that is continuously driven by a motor 138.

Figure 8:
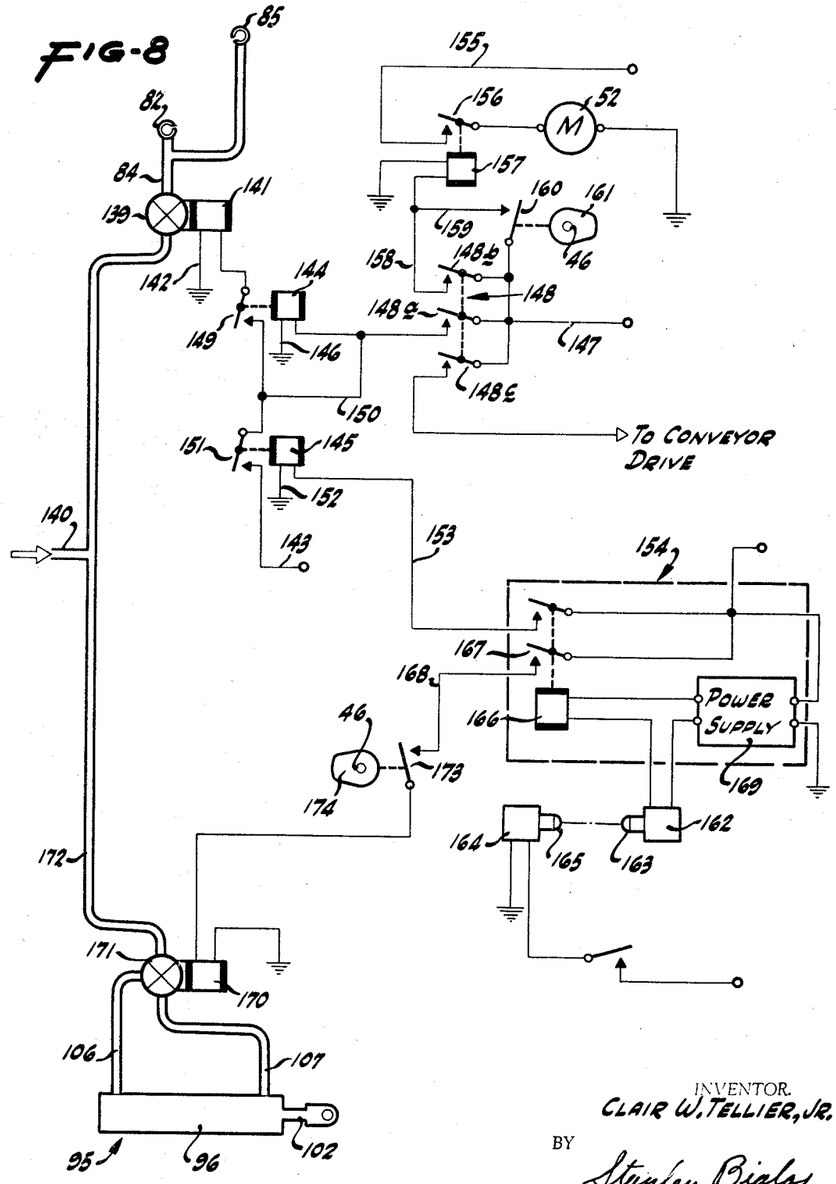
FIGURE 8 is a diagrammatic view of an illustrative control circuit for the apparatus.

As indicated hereinbefore, several of the functions performed by the apparatus are cyclically repetitive and occur in accordance with the time relationships enforced thereon by the cams 45, 59 and 74. However, other of the functions performed by the apparatus are tied more directly to a roll product 21 and the particular condition thereof at any instant. A typical control circuit depicting the interrelationship of the latter functions is illustrated in FIGURE 8 and reference will now be made thereto.

One such controlled function constitutes the delivery of air under pressure through the nozzle structures 82 and 85 both of which are connected to the aforementioned flexible hose 84. The hose in turn is connected through a valve 139 and delivery conduit 140 to a source of compressed air or other gaseous fluid (not shown). The valve 139 has a solenoid section 141 that is operative to change the valve 139 from the normally closed condition thereof to its open condition in which communication is established therethrough between the delivery conduit 140 and flexible hose 84. The solenoid valve 139, 141 may be completely conventional and any suitable commercially available structure may be used.

The solenoid 141 is connected to an appropriate power source, such as a 110 volt A.C. supply, through conductors 142 and 143 the last of which has a pair of relay structures 144 and 145 connected in series therewith. The relay 144 may be of the self-holding type, in which event it remains energized after initial energization thereof until the occurrence of some event other than the opening of the power circuit thereof, the closing of which caused such initial energization. In the particular instance illustrated, the relay 144 is connected to the aforementioned power source through the conductors 146 and 147, the last of which has a normally open switch 148 connected in series therewith.

It is apparent that if the relay 144 is de-energized, it will remain in such condition until the switch 148 is closed, whereupon a circuit will be completed through the relay winding. Once the relay 144 is energized, the movable contact 149 thereof is closed and the relay then remains energized irrespective of the position of the switch 148 because the relay is of the self-holding type, as evidenced by the conductor 150. In the present instance, the holding circuit will be completed through the conductor 146, winding of the relay 144, conductor 150 and the conductor 143, assuming that the relay 145 is in the de-energized condition thereof illustrated.

The relay 145 has a normally closed contact 151, and the energizing coil of the relay is connected to one side of the aforementioned power source through a conductor 152 and to the other side of such power source through a conductor 153 and a control circuit 154. Quite evidently, when the condition of the control circuit is such that the relay 145 is energized, the relay contact 151 is thereby opened, whereupon the circuit through the conductor 143 is broken and, as a consequence, the relay 144 will be de-energized if the switch 148 is then open.

The switch 148 is a multiple contact switch (separate switches could be used) having a normally open contact 148a adapted to complete the circuit through the conductor 147, a normally open contact 148b that functions to complete the circuit of the motor 52, and a normally closed contact 148c that interrupts the circuit for the drive motor (not shown) of the conveyor 20. The switch 148 is intended to control operation of the apparatus by initiating each cycle of operation thereof, and it is located so as to be triggered or actuated by movement of each cant along the conveyor 20 and into the position illustrated in FIGURE 2 in which the cant therein shown is oriented for displacement into the operating station by the pusher arms 38 and bar 39 thereof.

The circuit of the motor 52 includes a conductor 155 connected to one side of the aforementioned power source, and included in such conductor is a normally open switch 156 that is adapted to be closed by a solenoid 157 upon energization thereof. The energizing circuit for the solenoid 157 includes a conductor 158 that is connected to such power source through the switch 148 and conductor 147. More particularly, the conductor 158 is adapted to be completed by the switch element 148b whenever the switch 148 is actuated by an incoming cant. The solenoid 157 is also adapted to be energized through a conductor 159 which has a switch 160 therein adapted to be closed by a cam 161 mounted upon the shaft 46 so as to be rotated thereby whenever the motor 52 is energized.

The control circuit for the motor 52 normally has the configuration illustrated in FIGURE 8 in which the switch 156 is open and the motor 52 de-energized. However, each time a cant 21 is advanced by the conveyor 20 into the position shown in FIGURE 2, the switch 148 is actuated whereupon the solenoid 157 is energized through the circuit defined by the conductor 147, switch contact 148b, conductor 158, and energizing coil of the solenoid 157. As a result, the contact 156 is closed and the motor 52 thereby energized. Upon energization of the motor 52 the pusher arms 38 are swung inwardly, as heretofore described, to displace the cant 21 from the conveyor and into the operating station defined by the rollers 27 and 28. Such movement of the cant releases the switch 148 whereupon the contact 148b interrupts the conductor 158 so that the solenoid 157 can no longer be energized therethrough.

However, as soon as the motor 52 is energized, the shaft 46 commences to rotate because it is drivingly connected to the motor through the endless belt 48 in the manner heretofore described. Rotation of the shaft 46 through a very small angular distance (for example, a few degrees) causes the cam 161 to close the switch 160 with the result that the solenoid 157 then remains energized independently of the switch contact 148b. The cam is configurated such that the switch 160 remains closed and the motor 52 thereby remains energized until a cycle of operation has been completed at which time the cam 161 permits or causes the switch 160 to move to the open position thereof. If at such time another cant is properly located along the conveyor 20 for displacement therefrom into the operating station, the motor 52 remains energized because the switch 148 is actuated and another cycle of operation commences immediately. If no such cant is present along the conveyor 20, the apparatus is de-energized because both the switch contact 148b and switch 160 are open.

As noted hereinbefore, the conveyor 20 may comprise a part of the web rewinding apparatus with which the tail securing apparatus is associated and in such event, the conveyor can be energized at the rewinding apparatus whenever a cant is ready to be transported to the tail securing apparatus. However, the switch contact 148c is in the control circuit of the conveyor motor and prevents energization thereof when a cant is in proper position on the conveyor 20 for displacement into the operating station of the tail securing apparatus. Whenever the tail securing apparatus is ready to receive another cant, which is evidenced by the absence of a cant from such proper position as shown in FIGURE 2, the switch contact 148c is closed so that the conveyor 20 may then be energized.

The condition of the control circuit 154 is determined by a light sensitive device such as a phototube 162 that is arranged in association with an optical lens system 163 adapted ot collect light directed theretoward from a light source 164 and lens system 165 arranged therewith. Ordinarily, the space between the light source 164 and phototube 162 is open so that the light energy transmitted by the lens system 165 to the lens system 163 is collected thereby and directed onto the photosensitive cathode of the phototube 162. This will cause the phototube to conduct current, and under this condition of phototube conduction, the relay 145 is de-energized and the contact 151 thereof is closed. However, when the beam light directed toward the phototube 162 is interrupted, the control circuit 154 will cause the relay 145 to become energized, whereupon the contact 151 thereof is opened.

More particularly, the control circuit 154 includes a relay or solenoid 166 equipped with a movable contact 167 which is adapted to selectively close a circuit through the conductor 153 or through a conductor 168. The energizing coil of the solenoid 166 is connected in circuit with the phototube 162 in a manner such that the solenoid is energized whenever the phototube 162 is conductive because of the incidence of light on the photosensitive cathode thereof. In the configuration shown, the phototube 162 is in a conductive state so that the solenoid 166 is energized and the movable contact 167 thereof is in the position thereof that enables a circuit through the conductor to be completed. When the solenoid is de-energized, which is caused by the interposition of an essentially opaque material between the lens systems 163 and 165, the relay will be de-energized and the movable contact 167 will complete the circuit through the conductor 153, whereupon the relay 145 will be energized. The phototube 162 is arranged in circuit with a power supply 169, as indicated in FIGURE 8, which power supply is connected to the aforementioned electric power source and provides the requisite operating potentials for the phototube.

The control circuit 154 is connected through the conductor 168 with the solenoid section 170 of a valve 171 that communicates through a conduit 172 with the delivery conduit 140 supplying compressed air to the apparatus from a suitable source. The valve 171 is connected by the conduits 106 and 107 with the cylinder 96 of the aforementioned motor means 95. Ordinarily, the solenoid 170 is de-energized and the valve 171 is in a condition such that the conduit 172 is in communication with the conduit 107, whereupon compressed air urges the piston rod 102 inwardly or toward the left, as viewed in FIGURE 8. Quite evidently, at this time the valve 171 exhausts the conduit 106 to permit such inward displacement of the rod 102 and piston connected therewith.

Interposed in the conductor 168 is a normally open switch 173 that is adapted to be closed by a cam 174 mounted upon the shaft 46 so as to be rotated whenever the motor 52 is energized. Prior to the switch 148 being actuated to initiate a cycle of operation, the switch 173 is open and the configuration of the cam 174 is such that the switch remains open throughout the initial portion of the cycle of operation of the apparatus. Therefore, when the phototube 162 treminates its conduction because of the interposition of the tail of a cant between the lens systems 163 and 165 and the solenoid 166 is thereby de-energized, the circuit through the condutcor 168 is interrupted because of the movement of the contact 167.

At about this time, the cam 174 displaces the switch 173 into the closed position thereof so that the energizing circuit for the solenoid 170 is in a condition to be closed by the contact 167 whenever the relay 166 is again energized. This latter condition occurs when the tail of a cant is withdrawn from between the lens systems 163 and 165 so as to permit again the incidence of light on the photosensitive cathode of the phototube 162. When the solenoid 170 is energized, the valve 171 connects the supply conduit 172 with the conduit 106 with the result that the piston rod 102 is displaced outwardly or to the right, as viewed in FIGURE 8. At this time, the conduit 107 is connected to atmosphere by the valve 171. The solenoid 170 is maintained in an energized state by the cam 174 (via the switch 173) until the tail of a cant has adhesive applied thereto, and shortly thereafter the cam permits the switch 173 to open, whereupon the solenoid 170 returns (by spring biasing means in the usual instance) to its initial condition and the piston rod 102 is thereby returned to its starting condition.

The photosensitive device 162 and light source 164 therefor are located (as shown best in FIGURE 2) just below the container 128 of the adhesive applicator structure and in alignment with one of the spaces 123 defined between successive tines. In this position, the beam of light transmitted from the source 164 to the photosensitive device 162 is adapted to be interrupted by the tail of a roll product 21 when such tail is unwound and as a consequence, extends downwardly between the rows 87 and 88 of tines, as will be described in greater detail hereinafter.

Operation

In describing a cycle of operation of the apparatus, reference will be made in particular to FIGURES 9 through 16, inclusive, which respectively illustrate various stages of such cycle of operation.

Figure 9:
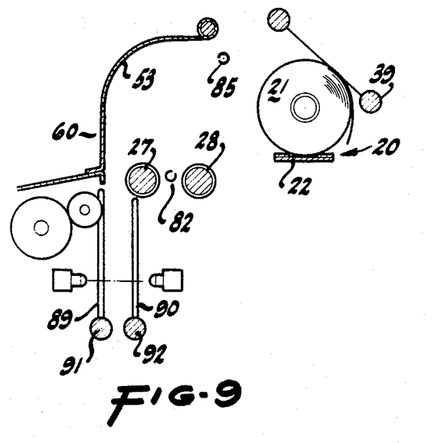
FIGURES 9 through 16, inclusive, are largely diagrammatic views illustrating the operational sequence performed by the apparatus in receiving a roll product, securing the tail thereof to the underlying web convolution, and then discharging the roll product toward a wrapping machine.

In the condition of the apparatus as it is shown in FIGURE 9, a cant 21 has been advanced by the conveyor 20 into a position whereat it is ready for displacement into the operating station defined by the rollers 27 and 28. Therefore, the conveyor is stopped, the tines 89 and 90 are in their normal position of spaced apart relationship, the hood 60 is closed and the stop elements 53 are retracted into the hood. It may be noted that the adhesive applicator wheels 124 are being rotated because of their engagement with the continuously driven transfer roller 127, and the discharge conveyor 31 is in motion. In addition, the roller 28 is in its normal horizontal position and no air is being discharged from the nozzle structures 82 and 85. Since the cant 21 is located for displacement into the operating station, the switch 148 has been actuated by the cant, and as a result a cycle of operation is initiated. Therefore, the motor 52 is energized, and the rollers 27 and 28 are being continuously rotated as is the shaft 46 and cams 45, 59, 74, 161 and 174 mounted thereon. Also, the solenoid 144 has been energized so that air under pressure is being discharged from the nozzle structures 82 and 85.

Figure 10:
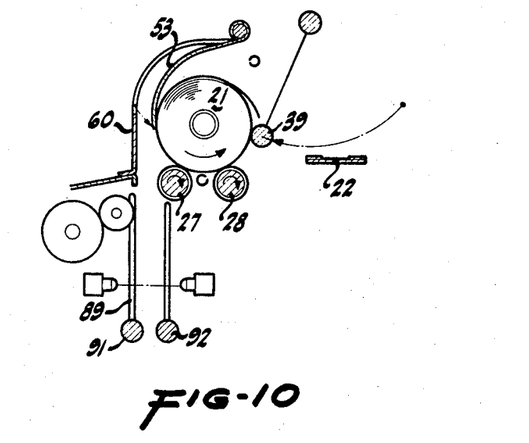

Almost immediately after the motor 52 has been energized, the resulting displacement of the shaft 46 and cams 45 and 59 mounted thereon causes the pusher arms 38 and pusher bar 39 carried thereby to be swung inwardly against the cant 21 to displace the same into the operating station (as shown in FIGURE 10) and, similarly, causes the stop elements or arcuate arms 53 to be swung inwardly for cooperation with the pusher bar 39 to center the cant in such operating station. Since the rollers 27 and 28 are rotating, rotational movement is imparted to the cant 21 as soon as it is located thereon. Each of the rollers (as shown best in FIGURE 1) may be equipped with a plurality of longitudinally spaced tread or tire elements formed of a material having a relatively high coefficient of friction, such as rubber, so as to facilitate the transfer of rotational movement to the cant 21. Otherwise, the various components of the apparatus are in essentially the same condition as described with reference to FIGURE 9.

Figure 11:
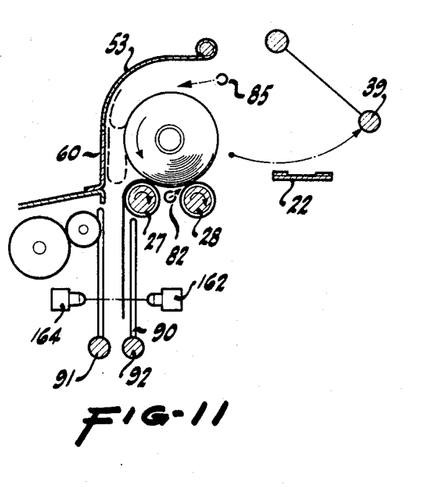

Subsequently, as shown in FIGURE 11, the pusher bar 39 is returned to its outermost position and the stop elements 53 are returned to the hood 60 and nest within the openings 61 respectively provided therefor. The cant 21 is rotated in a counter-clockwise direction, as viewed in FIGURE 11, by the rollers 27 and 28; and as a consequence, the tail or terminal convolution of the cant tends to be wound thereabout. However, air under pressure is being discharged from the nozzle structures 82 and 85; and eventually during the rotational movement of the cant, the air lifts the tail therefrom and advances the tail in a counter-clockwise direction but at an accelerated rate so that the tail is thereby unwound from the cant. As shown in FIGURE 11, the tail as it is being unwound from the cant may assume a somewhat U-shaped configuration in which it defines a pocket receiving and trapping the discharging air therein, whereby a positive pressure force is developed against the tail which unwinds it with considerable facility.

The configuration of the hood 60 and substantially uninterrupted arcuate surface thereof, which in this sense is defined in part by the arcuate arms 53 which nest within the recesses 61 therefor, cooperates with the discharging air in forming the pocket in the tail of the cant as the tail is unwound therefrom. It may be noted that the hood surface is substantially continuous and uninterrupted so that the tail of the cant can move smoothly thereover, and the tines 89 and depending lip of the discharge conveyor 30 are in substantial alignment with the lower extremity of the hood so that essentially no abutments are formed along the path of movement of the cant tail which might inhibit or generally interfere with the unwrapping of the tail from the cant.

Ultimately, the tail is unwound from the cant to the extent that it projects downwardly between the spaced apart rows 87 and 88 of tines 89 and 90 and is of sufficient length to reach a position at which it interrupts the light beam being transmitted from the light source 164 to the phototube 162. It may be noted that since the location of the tail with respect to the cant cannot be predicted on a cant-by-cant basis at the time each cant is positioned upon the rollers 27 and 28, it may happen that the tail portion which is initially unwound from a cant may not be of sufficient length to extend downwardly to a location at which it interrupts the light beam transmitted from the source 164 to the phototube 162. Should this occur, such "short" tail is simply rewound upon the rotating cant and is thereafter again unwound therefrom; and quite evidently, such subsequent unwinding (which occurs in the same cycle of operation) will provide a sufficient length of tail to interrupt such light beam.

As soon as the light beam is interrupted, the relay or solenoid 166 is de-energized (FIGURE 8) and, therefore, the holding circuit of the relay 144 is broken and such relay is de-energized, whereupon the discharge of air from the nozzle structures 82 and 85 is terminated. Otherwise, the various elements of the apparatus remain in substantially the same operating condition, and the tail simply starts to be rewound onto the cant 21 as a consequence of the counterclockwise rotation continuously imparted thereto by the rollers 27 and 28.

Figure 12:
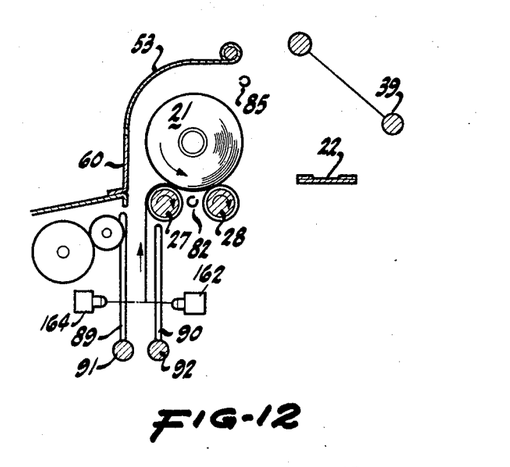

Such rewinding of the tail eventually withdraws the same from between the light source and phototube, as shown in FIGURE 12, and the phototube senses the moment at which the tail leaves such interposition because the light that again becomes incident on the photosensitive cathode of the tube causes the same to conduct, with the result that the relay 166 is again energized as is the solenoid 170. Thus, the motor means 96 is energized in a direction such that the piston rod 102 is displaced toward the right, as viewed in FIGURE 8, and the resultant clockwise displacement of the cam 108 (as viewed in FIGURE 5) causes the tines 89 and 90 to be displaced in a counterclockwise direction (compare FIGURES 12 and 13) to displace the upwardly moving tail against the adhesive applicator rollers 124, whereupon adhesive is deposited onto the tail, as shown in FIGURE 13.

By referring to FIGURE 5, it will be noted that the cam 108 is symmetrical and has a recessed portion adjacent each end thereof. Therefore, the tines 89 and 90 will have the generally vertical orientation illustrated in FIGURE 5 whenever the cam follower 109 is engaging either of such recessed portions which will respectively occur when the piston rod 102 is in the inner and outer positions thereof. Thus, the length of time that adhesive is being applied to the tail of the cant is determined by the configuration of the cam and, in particular, to the length of the raised cam surface thereof.

Figure 13:
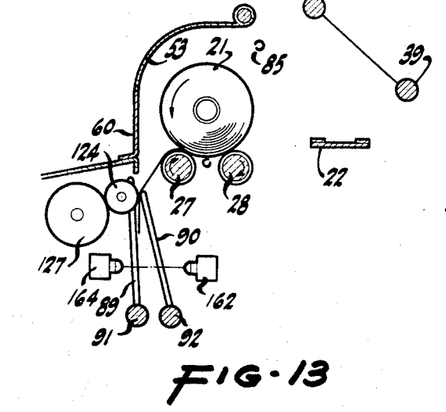

In the particular apparatus herein considered, the recessed portion of the cam 108 corresponding to the outer position of the piston rod 102 causes the tines 89 and 90 to be returned from the adhesive-applying position thereof shown in FIGURE 13 to the normal position thereof illustrated in FIGURE 12 slightly before the outer end portion of the tail is drawn across the adhesive applicator rollers 124. Therefore, adhesive is not applied to such outer end portion of the tail which leaves a small or restricted free end portion thereof that can be readily grasped to initiate unwinding of the roll product during use thereof by the consumer. Also, since the commencement of the adhesive-applying operation is initiated by and at the instant that the tail is withdrawn from between the light source 164 and phototube 162, each cant and the tail thereof will have the same length of adhesive applied thereto (the width of adhesive being determined by the number and width of the adhesive applicator rollers). As seen clearly in the drawings, the length of adhesive will reside at an interface between the tail and the underlying convolution after the tail has been completely rewound to adhere the tail to the underlying convolution.

Figure 14:
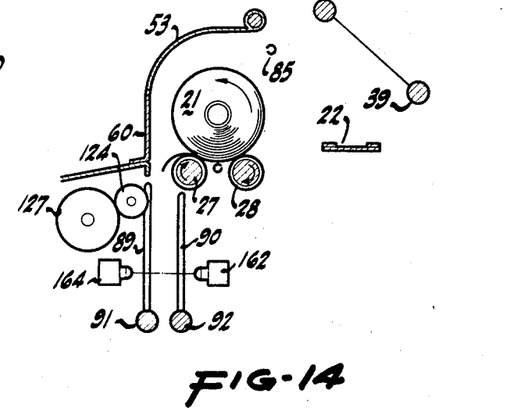

The switch control cam 174 permits or causes the switch 173 to be opened just after the tail of the cant has been withdrawn from between the tines 89 and 90, as shown in FIGURE 14, whereupon the solenoid 170 is returned to its prior or initial condition and the piston rod 102 is then returned to its starting or innermost position. Such return movement of the piston rod 102 will cause the tines 89 and 90 to swing inwardly to the position thereof shown in FIGURE 13, but at this time the tail of the cant is completely withdrawn from between the tines and such movement thereof performs no adhesive-applying function. Eventually, the tail is completely wound about the cant 21, as shown in FIGURE 15, and the adhesive immediately commences to set so as to secure such tail in the wound position thereof.

Figure 15:
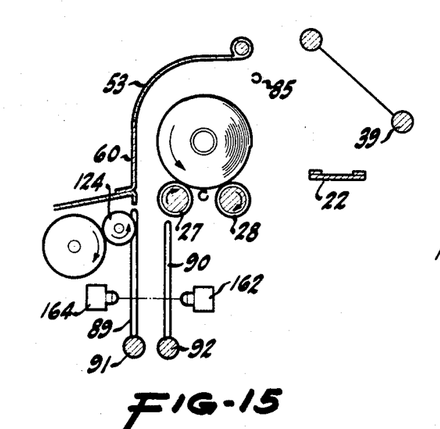
Figure 16:
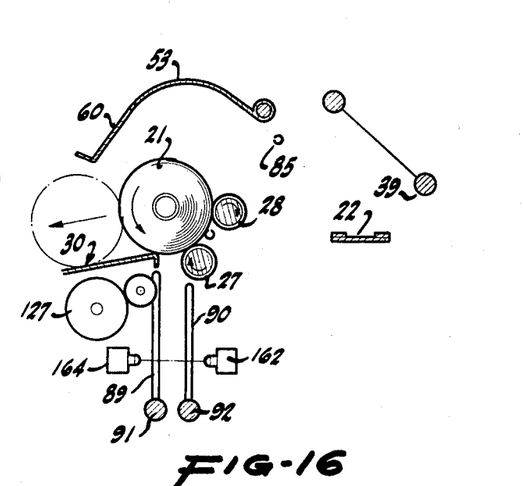

At about this time, the shaft 46 has been rotated into a position such that the cam 74 causes the rollers 27 and 28 to be rotated in a counter-clockwise direction about the longitudinal axis of the roller 27, as shown in FIGURE 15; and at this same time, the cam 59 causes the arcuate arms 53 to rotate in a clockwise direction to lift the hood 60 away from the discharge chute 30. Therefore, such angular displacement of the roller 28 causes the cant 21 to be discharged outwardly and onto the inclined chute 30, as shown in FIGURE 16. After the cant has been so discharged from the apparatus, the hood 60 and arms 53 are returned to the starting position thereof shown in FIGURE 9, and the switch cam 161 has been rotated at this time into a position in which it permits or causes the switch 160 to open, whereupon the energizing circuit of the motor 52 is broken if another cant has not been advanced by the conveyor 20 into a position for displacement into the operating station. Therefore, a cycle of operation has been completed and the apparatus is in a condition to commence another such cycle.

In the operation of the apparatus, the discharge of air from the nozzle structures 82 and 85 is terminated after the tail has been unwound from the cant and is extending downwardly between the two rows of tines 89 and 90, as heretofore described. This arrangement not only conserves air, but it also obviates any chance of a glued and rewound tail from again being unwound before the cant is ejected and becoming tangled because of the glue thereon. Thus the function of the apparatus is made independent of the slip or tackiness of the glue and of other variables. In some situations, one of the nozzle structures (e.g., the nozzle structure 82) has been omitted and the apparatus functioned satisfactorily. As indicated hereinbefore, the type of adhesive applicator structure employed in the apparatus is not critical and, for example, it may be desirable in some environments to use a structure in which the applicator rollers are neither knurled nor grooved and are positively driven through a gear train connected therewith, rather than by the frictional drive arrangement described herein. Further, the discharge conveyor may take various forms and will depend primarily upon the type of apparatus following the same. Thus, for example, the compression belt 31 might be omitted in some environments.

Usually, because of the length of the apparatus, it will be advantageous to provide identical mechanical drive components adjacent each end thereof. Accordingly, and by way of example, the shaft 46 will be equipped at the end portion thereof adjacent the frame end plate 35 with additional cam elements respectively duplicating the cam elements 45, 59 and 74, and with duplicate linkage structures respectively connected therewith for imparting the aforementioned motions to the pusher arms 38, stop elements 53, rollers 27 and 28, and so forth.

It is evident from the foregoing that all of the functions performed by the apparatus are accomplished at a single station into which each cant is displaced from the infeed conveyor 20 and from which it is discharged after the tail of the cant has been secured thereto. At such station, each cant is rotated continuously from the time of admission thereto to the time of discharge therefrom. Such rotational movement of the cant is utilized in the tail securing operation and, therefore, rotating the cant continuously significantly minimizes the time required to effect a cycle of operation—which time, for example, may be in the order of five seconds.

While in the foregoing specification an embodiment of the invention has been set forth in considerable detail for purposes of making an adequate disclosure thereof, it will be appreciated by those skilled in the art that numerous changes can be made in such details without departing from the spirit and principles of the invention.

What is claimed is:

1. In a method of securing the tail of a roll product to the underlying convolution thereof, the steps of continuously rotating said roll product in a direction tending to wind said tail thereabout at a tail-securing station, accelerating the tail end portion of said roll product during said rotation thereof to unwind said tail end portion therefrom, and applying adhesive to said tail as the tail is moving while it is being rewound upon said roll product at the tail-securing station, whereby the tail is adhesively secured to the underlying convolution of said roll product after being rewound thereabout.

2. In a method of securing the tail of a roll product to the underlying convolution thereof, the steps of rotating said roll product in a direction tending to wind said tail thereabout at a tail-securing station, directing a gaseous discharge toward said roll product to unwind a tail end portion therefrom in excess of a predetermined length during said rotation thereof, rewinding the tail until the tail extends a predetermined length from the roll and sensing the extension from said roll product of said tail end portion of predetermined length and applying a line pattern of adhesive at a predetermined interface location between the tail and the underlying convolution for securing the tail end portion to the underlying convolution of said roll product after being rewound thereabout, said unwinding, rewinding and adhesive-applying being accomplished while the roll product is located at the tail-securing station; and, subsequently removing the roll product with the adhered tail from the tail-securing station.

3. In a method of securing the tail of a roll product to the underlying convolution thereof, the steps of continuously rotating said roll product in a direction tending to wind said tail thereabout at a tail-securing station, directing a gaseous discharge toward said roll product to unwind a tail end portion therefrom in excess of a predetermined length during said rotation thereof, sensing the extension from said roll product of said tail end portion of predetermined length and applying an adhesive thereto as the tail end portion is moving while being rewound about said roll product at the tail-securing station to adhesively secure the tail end portion to the underlying convolution of said roll product after being rewound thereabout.

4. In a method of securing the tail of a roll product to the underlying convolution thereof, the steps of continuously rotating said roll product in a direction tending to wind said tail thereabout at a tail-securing station, directing a gaseous discharge toward said roll product to unwind a tail end portion therefrom in excess of a predetermined length during said rotation thereof, sensing the extension from said roll product of such tail end portion of predetermined length and applying an adhesive thereto as the tail end portion is moving while being rewound about said roll product at the tail-securing station to adhesively secure the tail end portion to the underlying convolution of said roll product after being rewound thereabout, and terminating the application of adhesive a spaced distance from the free end of said tail to provide an unsecured flap which can be grasped to initiate unwinding of said roll product during use thereof.

5. In a method of securing the tail of a roll product to the underlying convolution thereof, the steps of rotating said roll product in a direction tending to wind said tail thereabout at a tail-securing station, directing a gaseous discharge toward said roll product to unwind a tail end portion therefrom in excess of a predetermined length, sensing the extension from said roll product of said tail end portion of predetermined length and displacing said tail end portion laterally and into engagement with an adhesive applicator to apply a length of adhesive to said tail end portion, whereby said tail is adhesively secured to the underlying convolution of said roll product after being rewound thereabout.

6. In a method of securing the tail of a roll product to the underlying convolution thereof, the steps of continuously rotating said roll product in a direction tending to wind said tail thereabout, directing a gaseous discharge toward said roll product to unwind a tail end portion therefrom in excess of a predetermined length during said continuous rotation, sensing the extension from said roll product of the tail end portion of predetermined length and displacing the same laterally and into engagement with an adhesive applicator to apply adhesive to said predetermined length as the tail end portion is being rewound about said roll product to adhesively secure the tail end portion to the underlying convolution of said roll product after being rewound thereabout.

7. The method of claim 6 and including the further step of displacing the tail end portion laterally in the opposite direction to terminate the application of adhesive a spaced distance from the free end of said tail to provide an unsecured flap which can be grasped to initiate unwinding of said roll product during use thereof.

8. The method of claim 7 and including the further step of detecting the unwinding of said tail end portion in excess of a predetermined length and terminating the gaseous discharge in response thereto.

9. Apparatus for securing the tail of a roll product to the underlying convolution thereof, comprising means for supporting a roll product and for imparting rotational movement thereto in a direction tending to wind its tail end portion thereabout, an adhesive applicator structure, tail-displacement mechanism including spaced-apart rows of tines, said tail end portion being receivable between said rows and at least one row being selectively operable to displace said tail end portion into adhesive-receiving engagement with said adhesive applicator structure, means for unwinding said tail end portion from the roll product and for extending the tail end portion thereof into a position of operative relation with said tail-displacement mechanism, and means for actuating said tail-displacement mechanism to displace said tail end portion into engagement with said adhesive applicator structure to effect the deposition of adhesive onto said tail and thereby adhesively secure the same to the underlying convolution of the roll product after being rewound thereabout.

10. The apparatus of claim 9 in which said tail-displacement mechanism is located adjacent said adhesive applicator structure and is operative to displace the aforesaid tail end portion laterally and into engagement with said adhesive applicator structure.

11. Apparatus for securing the tail of a roll product to the underlying convolution thereof, comprising means for supporting a roll product and for imparting rotational movement thereto in a direction tending to wind its tail end portion thereabout, hood structure adjacent said means and disposed thereat for circumferential extension about a portion of said roll product supported thereby, gaseous discharge means including nozzle structure for directing a gaseous discharge toward said roll product to unwind the tail end portion therefrom, and adhesive applicator structure for applying adhesive to said unwound tail to adhesively secure the same to the underlying convolution of said roll product after the tail has been rewound thereabout, said hood structure being spaced from any said roll product supported by said support means and being cooperative with said gaseous discharge means in unwinding the tail end portion from said roll product.

12. The apparatus of claim 11 in which said hood structure is selectively movable between a closed position in which it effects the aforesaid cooperation with said discharge means and an open position permitting removal of a roll product from said support means after the tail has been secured to said underlying convolution, and in which means are included for selectively moving said hood structure between the open and closed positions thereof.

13. The apparatus of claim 11 in which said nozzle structure is directed generally toward said hood structure and the gaseous discharge is directed thereby through the space defined between said hood structure and a roll product supported by said support means.

14. Apparatus for securing the unaffixed tail of a roll product to a convolution thereof underlying said tail, comprising frame structure provided by said apparatus, roll-rotating mechanism supported by said frame structure and defining an operating station whereat said mechanism rotates said roll product about its longitudinal axis in a direction tending to wind said tail thereabout, tail accelerating means located at said operating station for unwinding said tail as the roll product is rotated, adhesive applicator structure located at said operating station for depositing tail-securing adhesive as a line pattern of adhesive at a predetermined location, said location being an interface between the tail and the underlying convolution when the tail is rewound, tail length sensing means responsive to the rewinding of said tail from a length greater than a predetermined length to a predetermined length for controlling the deposition of adhesive, and selectively operable ejection mechanism for displacing said roll product from the operating station only after said tail has been rewound thereon with the tail adhesively secured thereto.

15. Apparatus for securing the unaffixed tail of a roll product to a convolution thereof underlying said tail, comprising frame structure provided by said apparatus, roll-rotating mechanism supported by said frame structure and defining an operating station whereat said mechanism rotates said roll product about its longitudinal axis in a direction tending to wind said tail thereabout, hood structure adjacent said roll-rotating mechanism and disposed thereat for circumferential extension about a portion of said roll product supported thereby, tail accelerating means including gaseous discharge nozzle structure located at said operating station for directing a gaseous discharge toward said roll product to unwind the tail end portion therefrom, adhesive applicator structure located at said operating station for depositing tail-securing adhesive onto said unwound tail as the roll product is rotated by said mechanism to adhesively secure the tail to the underlying convolution of said roll product after the tail has been rewound thereabout, and selectively operable ejection mechanism for displacing said roll product from the operating station after the tail of the roll product has been rewound thereon, said hood structure being cooperative with said nozzle structure in unwinding the tail end portion from said roll product and being selectively movable between a closed position in which it effects the aforesaid cooperation and an open position affording egress of said roll product from said operating station.

16. Apparatus for securing the unaffixed tail of a roll product to a convolution thereof underlying said tail, comprising frame structure provided by said apparatus, roll-rotating mechanism supported by said frame structure and defining an operating station whereat said mechanism rotates said roll product about its longitudinal axis in a direction tending to wind said tail thereabout, centering structure for properly locating each said roll product at the operating station for rotation by said mechanism, hood structure adjacent said roll-rotating mechanism and disposed thereat for circumferential extension about a portion of said roll product supported thereby, tail accelerating means including gaseous discharge nozzle structure located at said operating station for directing a gaseous discharge toward said roll product to unwind the tail end portion therefrom, adhesive applicator structure located at said operating station for depositing tail-securing adhesive onto said unwound tail as the roll product is rotated by said mechanism to adhesively secure the tail to the underlying convolution of said roll product after the tail has been rewound thereabout, and selectively operable ejection mechanism for displacing said roll product from the operating station after the tail of the roll product has been rewound thereon, said hood structure being cooperative with said nozzle structure in unwinding the tail end portion from said roll product and being selectively movable between a closed position in which it effects the aforesaid cooperation and an open position affording egress of said roll product from said operating station.

17. In combination with an infeed conveyor, apparatus for securing the unaffixed tail of a roll product to a convolution thereof underlying said tail, comprising frame structure provided by said apparatus, roll-rotating mechanism including spaced-apart rollers supported by said frame structure and defining an operating station extending along said conveyor and whereat said mechanism rotates said roll product about its longitudinal axis in a direction tending to wind said tail thereabout, centering structure for properly locating each said roll product at the operating station for rotation by said mechanism and including a pusher member for displacing each said roll product from said conveyor and onto the rollers, tail accelerating means located at said operating station for unwinding said tail as the roll product is rotated, adhesive applicator structure located at said operating station for depositing tail-securing adhesive at a predetermined location along an interface between the tail and the underlying convolution to adhesively secure the tail to the underlying convolution thereof after the tail has been rewound thereabout, and selectively operable ejection mechanism for displacing said roll product from the operating station after the tail of the roll product has been rewound thereon, said ejection mechanism including means for bodily displacing one of said rollers to eject said roll product from said operating station in a direction away from said infeed conveyor.

18. The apparatus of claim 17 and further comprising bracket structure supporting said rollers and being angularly displaceable to effect the aforesaid displacement of said one roller and thereby eject said roll product from said operating station.

19. In combination with an infeed conveyor, apparatus for securing the unaffixed tail of a roll product to a convolution thereof underlying said tail, comprising frame structure provided by said apparatus, roll-rotating mechanism supported by said frame structure and defining an operating station extending along said conveyor and whereat said mechanism rotates said roll product about its longitudinal axis in a direction tending to wind said tail thereabout, centering structure for properly locating each said roll product at the operating station for rotation by said mechanism and including a pusher member for displacing each said roll product from said conveyor and into the operating station, tail accelerating means including gaseous discharge nozzle structure located at said operating station for directing a gaseous discharge toward said roll product to unwind the tail end portion therefrom, adhesive applicator structure located at said operating station for depositing tail-securing adhesive onto said unwound tail as the roll product is rotated by said mechanism to adhesively secure the tail of the underlying convolution to said roll product after the tail has been rewound thereabout, hood structure adjacent said roll-rotating mechanism and disposed thereat for circumferential extension about a portion of said roll product supported thereby and being cooperative with said nozzle structure in unwinding the tail end portion from said roll product and being selectively movable between a closed position at which it effects the aforesaid cooperation and an open position affording egress of said roll product from said operating station, and selectively operable ejection mechanism for displacing said roll product from the operating station after the tail of the roll product has been rewound thereon.

20. The combination of claim 19 in which said roll-rotating mechanism includes a pair of spaced apart rollers extending longitudinally along said conveyor, and in which said ejection mechanism includes means for bodily displacing at least one of said rollers to effect said ejection of the roll product from said operating station.

21. The combination of claim 20 and further comprising sensing means responsive to the unwinding of said tail for initiating the deposition of adhesive, and in which means are also included for terminating the deposition of adhesive.

22. The combination of claim 21 in which said sensing means includes photoelectric detectors.

References Cited
UNITED STATES PATENTS

| | | | |
|---|---|---|---|
| 3,044,532 | 7/1962 | Ghisoni | 156—361 |
| 3,162,560 | 12/1964 | Henson et al. | 156—361 |
| 3,134,706 | 5/1964 | Alexander | 156—357 |

EARL M. BERGERT, *Primary Examiner.*

PHILIP DIER, *Examiner.*